Aug. 17, 1943.    A. H. DELAREUELLE    2,326,766
RADIO BEAM TRAINING DEVICE
Filed Nov. 6, 1942    3 Sheets-Sheet 1

INVENTORS
Arthur H. Delareuelle
Harry Price
BY
ATTORNEY

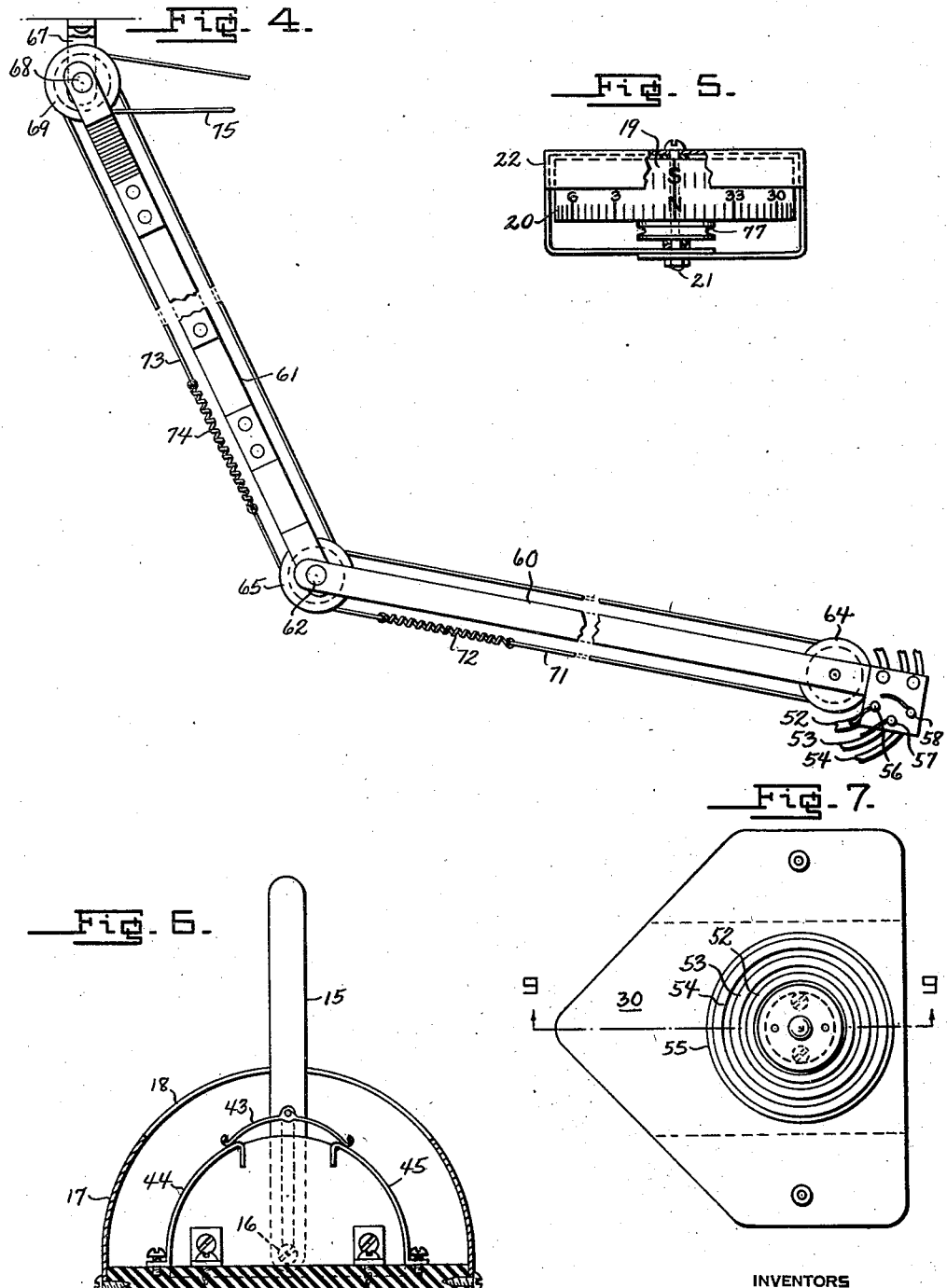

Aug. 17, 1943.   A. H. DELAREUELLE   2,326,766
RADIO BEAM TRAINING DEVICE
Filed Nov. 6, 1942   3 Sheets-Sheet 3
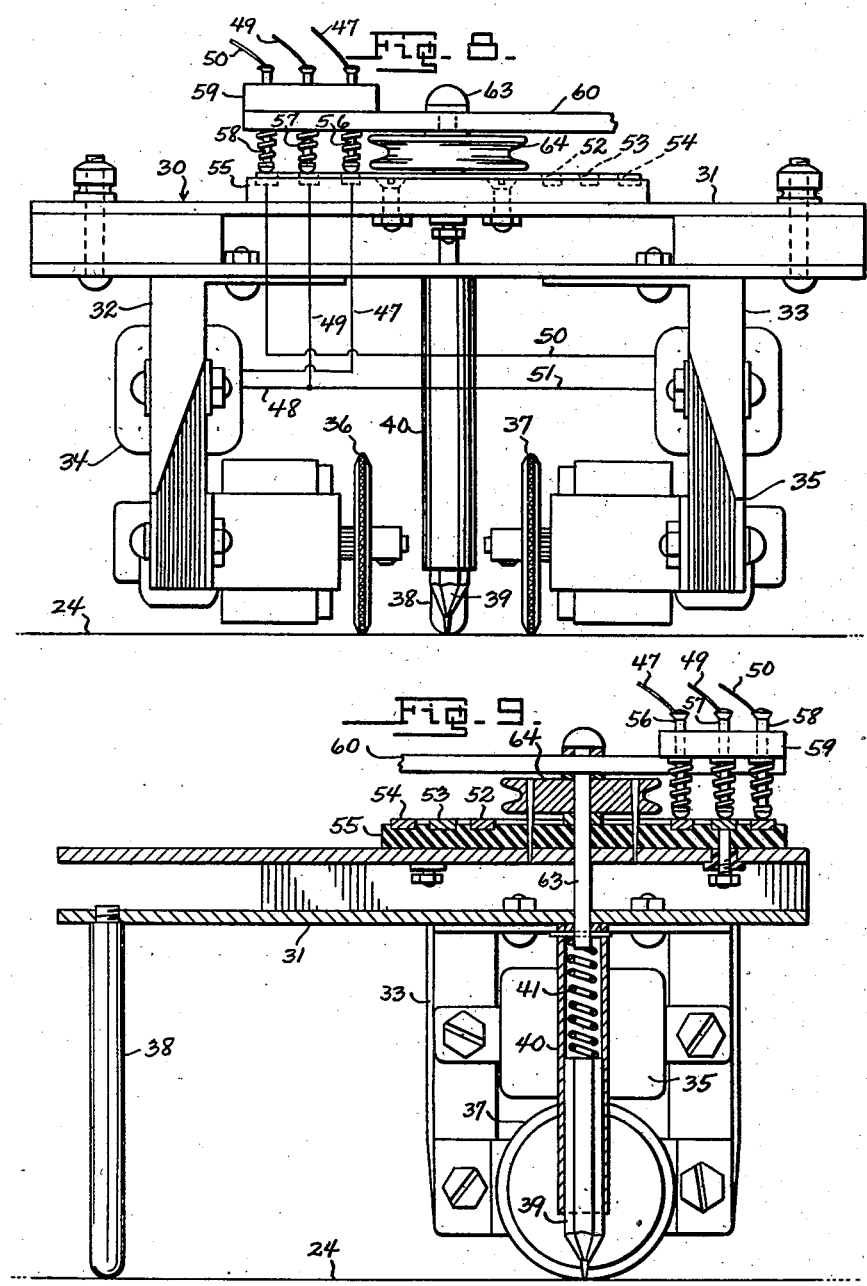
INVENTORS
Arthur H. Delareuelle
Harry Price
BY
ATTORNEY Patented Aug. 17, 1943

2,326,766

UNITED STATES PATENT OFFICE 2,326,766

RADIO BEAM TRAINING DEVICE

Arthur H. Delareuelle, United States Marine Corps, and Harry Price, United States Navy Application November 6, 1942, Serial No. 464,818

7 Claims. (Cl. 35—12)

(Granted under the act of March 3, 1883, as amended April 30, 1928; 370 O. G. 757)

Our invention relates in general to educational devices and in particular to a ground device for training a student in the art of operating an actual aeroplane, ship or the like by radio signals broadcast in a pattern from a radio station.

For example, in one conventional radio pattern, signals may be broadcast outwardly in four sections. In these sections, the signals might be the usual Morse code dot and dash signals representing the letters A and N. Either the A or N signal is heard in any one section and the signals are so arranged that different signals are heard in adjacent sections. In the marginal areas of these sections, where the A and N signals overlap, the combined signals effect a continuous hum in a narrow cone which diverges from the radio station. This continuous hum constitutes the "on course" signal or radio beam and serves to guide the pilot to the radio station. Should the pilot be flying a course generally away from the radio, such signals will become steadily weaker. Conversely, should the course taken by the pilot be generally towards the radio station, the signals will become steadily stronger. It is also usual for the radio station to periodically interrupt these signals with station identifying signals so that the pilot will know that he is somewhere within the signal pattern of a particular radio station.

The pilot of course has to be able to properly interpret such signals and manipulate his plane in accordance with such interpretation so as to bring it to the radio station along the radio beam.

The general object of our invention is to provide a stationary ground device simulating an aeroplane in actual flight for the purpose of training a student pilot in the art of flying by radio signals which might be broadcast in a pattern from a radio station to the aeroplane.

Another object of our invention is to provide a training device of the character described which is extremely simple in construction and operation and economical to manufacture.

A more specific object of our invention is to provide a stationary training device of the character described in which the student pilot by means of a control lever the operation of which is equivalent to operation of course determining controls such as the control stick and rudder deflection pedals of an aeroplane in actual flight directs a tracing unit at a speed simulating the speed of such aeroplane over a chart containing a radio beam pattern thereon to record on the chart the course of simulated flight taken by the student pilot, the flight course being selected by the student pilot through interpretation of radio signals transmitted to him, the nature of which are dependent upon the instant position of the tracing unit on the beam pattern, and hence his simulated position in flight; the course bearing at any instant being indicated to the student by means of a simulated compass which is coupled to the tracing unit for operation by the latter as it changes its course on the chart.

Another object of our invention is to provide a novel type of tracing unit for moving over and recording on a chart the course of simulated flight taken by the student pilot while operating the training device.

These and other objects of our invention will become more apparent from the detailed description to follow and from the accompanying drawings, in which like parts are indicated by like reference characters.

In the drawings, which illustrate a preferred form of our invention, Fig. 1 is a top plan view of our complete apparatus;

Fig. 4 is an enlarged plan view of the arm and pulley-rope system for mechanically coupling the compass card to the tracing unit;

Fig. 5 is an enlarged view of the details of the compass card arrangement for use by the observer and student;

Fig. 6 is an enlarged detailed vertical section of the control lever mechanism;

Fig. 7 is an enlarged plan view of the tracing unit shown in Figs. 1 and 2;

Fig. 8 is an enlarged view in elevation of the tracing unit; and

Fig. 9 is an enlarged vertical section taken on line 9—9 of Fig. 7.

Figure 1:
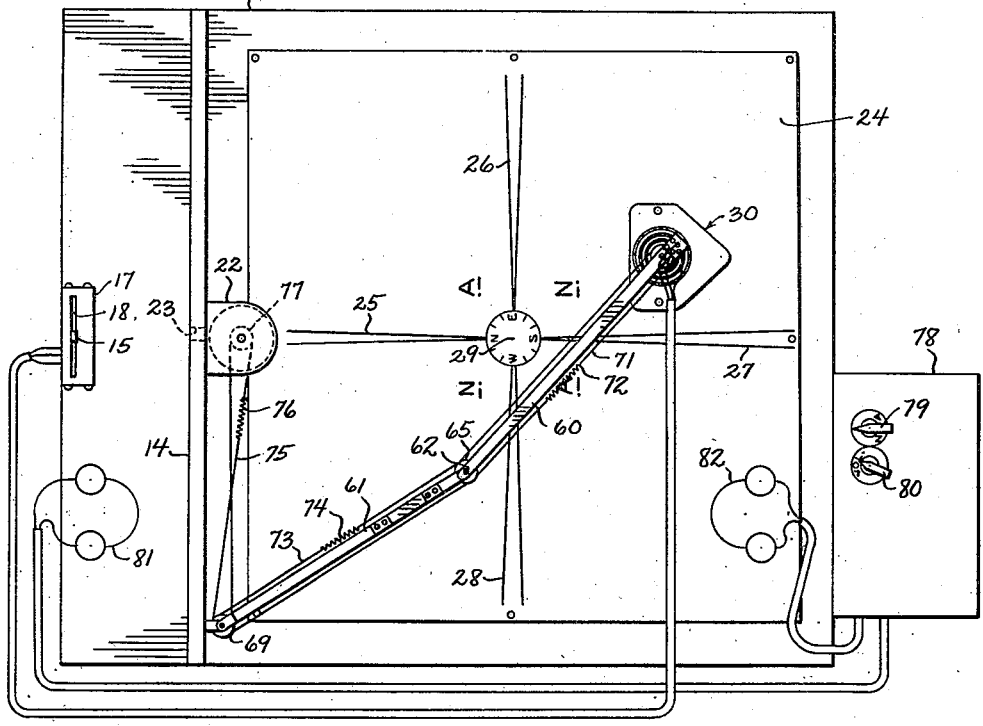

Referring now to the drawings, we provide a table 13 upon which is supported an upstanding partition member 14. This partition separates the student from the observer and also functions to support certain apparatus utilized in our invention, as will be later described.

The student who is to be seated at table 13 on the left side of partition 14 has under his control a lever 15 which is pivotally mounted at 16 (see Fig. 6) in a casing 17, the lever 15 being extended through a slotted portion 18 in the casing for operation by the student.

A pair of circular and superposed compass cards 19 and 20 are keyed or otherwise secured together on a pin 21, the latter being journalled in a frame member 22. A small aperture 23 is provided through the partition 14 and the frame 22 is so supported on the partition 14 that only the indicia of the top compass card 19 may be visible to the student through the aperture 23. The indicia of the bottom compass card 20 is visible only to the observer who is to be seated at the table 13 on the right side of partition 14.

The indicia on the bottom card 20 is displaced 180° out of phase with that on the top card 19 and thus the simulated "heading" indicated to the student on his side of partition 14 by compass card 19 will be repeated to the observer on the latter's side of partition 14 by compass card 20. For operation of our training device, the bottom compass card 20 is not essential but it is quite useful to initially synchronize the heading of a tracing unit on a chart with the simulated heading indicated to the student by compass card 19.

Disposed on the observer's side of table 13 but invisible to the student because of partition 14 is the chart 24 of any selected geographical area which includes thereon a layout of the particular radio beam pattern which would cover such area. This particular pattern illustrated as an example is one in which the axes of four beams, 25, 26, 27, and 28, lie at right angles to each other and emanate from a radio station assumed to be located at the center 29.

If the student were actually flying in the geographical area represented by the chart 24, the Morse code signal for the letter N would be heard if he happened to be in the section between beams 25 and 28 or the section between beams 26 and 27. Similarly, the Morse code signal for the letter A would be heard if the student happened to be in either the section between beams 25 and 26 or the section between beams 27 and 28. The steady hum or "on course" signal would be heard for such time as the plane was in the cone of any of the beams.

If the heading in any section was away from the center 29, such signal would become steadily weaker as he went further and further away from the center. Conversely, if his heading was towards the center, the signal would become steadily stronger. Also, as the student crossed from one section into the other, the steady hum or "on course" signal would be heard for such time as the plane was in the cone of any of the beams.

The tracing unit 30, as shown in detail in Figs. 7, 8 and 9, comprises a frame 31 having a pair of depending legs 32 and 33. Synchronous motors 34 and 35 having the same speed characteristics are secured respectively to the legs 32 and 33, and propelling wheels 36 and 37 are rotated respectively by the armature members of the motors 34 and 35 through suitable reduction gearing, not shown. These propelling wheels are adapted to move the tracing unit over the chart at a suitable speed simulating actual flight speed of an aeroplane.

A steadying arm 38 completes the support for the frame 31 and a pencil 39 for marking the chart 24 which is received in a tubular support 40 may be urged downwardly by a helical spring 41.

The synchronous motors 34 and 35 are connected in an electrical circuit (see Fig. 3) to a source of alternating current. This circuit may include a switch 42 of any suitable type and it will be seen that the motors 34 and 35 are controlled selectively through the control lever 15.

Figures 2, 3:
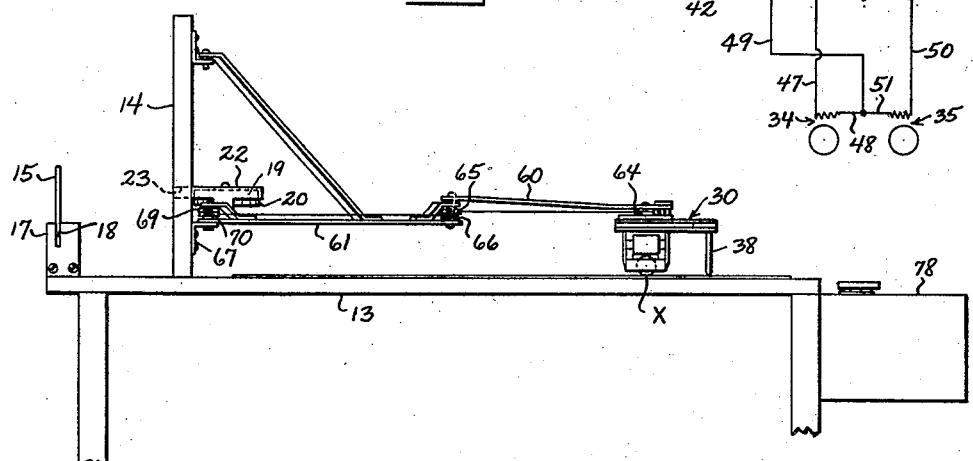
Fig. 2 is a side elevational view.
Fig. 3 is a circuit diagram of the electrical circuits utilized for controlling the direction of the tracing unit from the control lever operated by the student.

Referring now to Figs. 3 and 6 in particular, an arcuately shaped switch contact member 43 is mounted on lever 15. When lever 15 is in an upright position (which simulates a straight course of an aeroplane in assumed flight) contact member 43 bridges and makes electrical contact with a pair of arcuate switch contact members 44 and 45. This completes an electrical circuit to motor 34 from the source of alternating current which may be traced from one side of the source through conductor 46, switch contact members 43 and 44, conductor 47, motor 34, conductors 48 and 49, and through switch 42 to the other side of the source. Also at the same time an electrical circuit to motor 35 from the source of alternating current is similarly completed. This latter circuit may be traced through conductor 46, switch contact members 43 and 45, conductor 50, motor 35, conductors 51 and 49, and through switch 42 to the other side of the source.

Current is supplied to each of the motors 34 and 35 by means of three contact rings 52, 53 and 54 which are embedded in the surface of the top of a plate 55 of insulating material supported on the top of the frame 31 in conjunction with contact pins 56, 57 and 58 mounted in apertures through an insulating block 59.

Thus both motors 34 and 35 are energized, which causes both propelling wheels 36 and 37 to rotate at the same speed and propel the tracing unit 30 in a straight course over the chart 24.

When lever 15 is moved clockwise (to simulate a change in course in one direction of an aeroplane in assumed flight), contact member 43 will continue to engage contact member 45 but will break engagement with contact member 44, thus interrupting the circuit to motor 34 and stopping wheel 36. Motor 35 and wheel 37 connected therewith will, however, continue to run, causing the tracing unit to turn on a pivot about the then stationary wheel 36.

Conversely, when lever 15 is moved counterclockwise (to simulate a change in course in the other direction of an aeroplane in assumed flight), contact member 43 will continue to engage contact member 44 but will break engagement with contact member 45, thus interrupting the circuit to motor 35 and stopping wheel 37. Motor 34 and wheel 36 connected therewith will, however, continue to run, causing the tracing unit to turn on a pivot about the then stationary wheel 37.

It is thus evident that the course of the tracing unit 30 over chart 24 is determined solely by the student through manipulation of the control lever 15. Movement of lever 15 clockwise will cause the tracing unit to continually change its course in one direction of rotation as long as the lever is held in such position; movement of lever 15 counterclockwise will cause the tracing unit to continually change its course in an opposite direction of rotation; and with the lever 15 in a neutral or upright position, the tracing unit will move in a straight course across the chart 24.

Compass cards 19 and 20 are adapted to be rotated in phase with rotation of the tracing unit 30. This may be achieved in one manner by a pulley and rope system which mechanically couples the tracing unit 30 to the compass cards 19 and 20. This system includes a pair of arms 60 and 61, one end of each arm being joined together in a flexible joint by a connecting pin 62, and a pair of pulleys 65, 66 are keyed or otherwise secured to the pin 62 so that they will rotate together.

The other end of arm 60 is fastened to the frame 31 by means of a pin 63 and this end of the arm 60 also supports the contact pin block 59. Pin 63 is fixed against rotation and a pulley 64 is keyed or otherwise secured on the pin 63.

The other end of arm 61 is fastened to a bracket 67 by means of a pin 68 and another pair of pulleys 69, 70, are keyed or otherwise secured to pin 68 so that they will rotate together.

One rope 71 with spring tightener 72 is run from pulley 64 to pulley 65, a second rope 73 with spring tightener 74 runs from pulley 66 to pulley 70, and a third rope 75 with spring tightener 76 runs from pulley 69 to a pulley 77, keyed or otherwise secured to pin 21 so as to be rotatable with compass cards 19 and 20. Thus, by means of this pulley and rope system, any turning movement of the tracing unit 30 will effect an equal turning movement of the compass cards 19 and 20.

For transmitting to the student radio signals simulating radio signal broadcast to an aeroplane in actual flight, a beam oscillator 78 of any suitable type now on the market is positioned at the observer's side of the table 13. Oscillator 78 (the circuit details of which are conventional and hence have not been illustrated because they do not form a part of our invention), is provided with a pair of control handles 79 and 80. Handle 79 is utilized for selecting the correct signal to transmit to the student in accordance with the position of the marking pencil 39 of tracing unit 39 on the chart 24. This signal will either be an A or an N or a steady hum, as previously described. The handle 80 is utilized for varying the intensity of the signal in accordance with the direction of movement of the marking pencil 39. Head sets 81 and 82 are provided for use by the student and observer respectively in receiving the signals.

*Operation*

The operation of our training device is as follows:

With the student pilot seated at the left side of table 13 and wearing the telephone head set 81, the observer seated on the right side of table 13 places the tracing unit 30 on the chart 24 before him at any particular point, such as the point marked x in the section between beams 26 and 27 on the chart 24. The student pilot is then told that with the control lever 15 in a vertical position, he will be simulating flight on a straight course as indicated by the instant position of the simulated compass card 19; that should he desire to change his course in either direction, such may be accomplished by turning the lever 15 one way or the other from its vertical position; that as long as the lever 15 is held down from the vertical, his course will be continually changed as indicated by the rotating compass card 19, thus simulating actual turning movement of an aircraft; and further that when the desired change in course has been obtained, the simulated aircraft may be restored to movement in a straight line along the new course by restoring the lever 15 to the vertical position. With the lever 15 in a vertical position, the switch 42 is closed and this energizes both motors 34 and 35 of the tracing unit 30, causing the latter to move and record by pencil 39 a straight course over the chart 24 at a speed simulating the speed of an aeroplane in actual flight over the terrain represented by the geographical area on the chart.

The observer, with his head set on, then transmits to the student by means of the handle 79 on oscillator 78 signals corresponding to the position of the tracing unit 30 on chart 24. At the beginning, with the tracing unit in the section between beams 26 and 27, such signal would be an N and the intensity of the signal would be varied by the observer through operation of handle 80 on the oscillator in accordance with the direction of motion of the tracing unit 30 relative to the center 29 at which the radio station is assumed to be located.

The student "locates" himself with respect to the radio station assumed to be at the center 29 and by noting the signals as they are received by him and by interpreting their change in character and variation in intensity as he simulates a change in course of his stationary "trainer" by operation of lever 15 in one direction or the other, which course changes are indicated to him by the simulated compass 19, "flies" as near as possible to the radio station.

Upon completion of the "flight," the observer and student pilot are provided with an accurate graph of the "flight" and this graph can be used to determine the relative ability of the student in orienting himself in his trainer with respect to the radio beam pattern on the chart.

In conclusion, we wish it to be understood that various modifications and changes may be made in our device without departing from the spirit and scope of our invention as defined by the appended claims. As an example of such a change, the tracing unit 30 might be replaced by a modified version of the recorder shown and described in U. S. Patent No. 2,179,663 to Link, in which the autosynchronous motor shown in such patent would be replaced by a reversible motor, the direction of rotation of which would be controlled by lever 15, and a pulley mounted on one of the vertical shafts supporting one of the driving motors of the Link patent.

The invention described herein may be manufactured and used by or for the Government of the United States of America for governmental purposes without the payment of any royalties thereon or therefor.

Having thus set forth and disclosed the nature of this invention, what is claimed is:

1. A stationary trainer device for teaching a student in flying radio beam patterns, said device comprising a simulated compass visible to the student, a tracing unit remote from the student, said unit having chart marking means and means for propelling the tracing unit on a chart including a layout of a radio beam pattern thereon at an assumed forward speed of said trainer device, control means operable at the will of the student for changing the heading of said tracing unit on the chart, means coupling said simulated compass to said tracing unit for changing the heading of said compass in accordance with changes in heading of said tracing unit for indicating to the student simulated changes in heading of said trainer device, means operable for transmitting to the student signals simulating radio signals broadcast to an aeroplane in actual flight, said signals being transmitted in accordance with the heading and position of said tracing unit on said chart, and means for varying the intensity of such signals.

2. A stationary trainer device for teaching a student in flying radio beam patterns, said device comprising control means operable by said student, a simulated compass visible to the student, a tracing unit remote from the student, said unit having chart marking means and propelling wheels therefor, a chart on which said tracing unit is adapted to be moved, said chart including a layout of a radio beam pattern thereon, driving means coupled to said propelling wheels to move said tracing unit on said chart at an assumed forward speed of said trainer, means operable when said control means is in a neutral position to effect straight line movement of said tracing unit on said chart, means operable when and for as long as said control means is shifted from its neutral position to a first selected position for continuously changing the heading of said tracing unit in one direction of rotation, means operable when and for as long as said control means is shifted from its neutral position to a second selected position for continuously changing the heading of said tracing unit in the other direction of rotation, means coupling said simulated compass to said tracing unit for changing the heading of said compass in accordance with changes in heading of said tracing unit for indicating to the student a simulated heading of said trainer, means for transmitting to the student signals simulating radio signals broadcast to an aeroplane in actual flight, said signals being transmitted in accordance with the observed heading and position of said tracing unit on said chart, and means for varying the intensity of such signals.

3. A stationary trainer device for teaching a student in flying radio beam patterns, said device comprising control means operable by said student, a simulated compass visible to said student, a tracing unit remote from the student, said unit having marking means and a pair of axially aligned propelling wheels therefor, a chart on which said tracing unit is adapted to move, said chart including a layout of a radio beam pattern thereon, separately operable driving means coupled to each of said propelling wheels adapted to move said tracing unit over said chart at an assumed forward speed of said trainer, means operable when said control means is in a neutral position to simultaneously render operable both of said driving means whereby said tracing unit will move in a straight line on said chart, means operable when and for as long as said control means is shifted from its neutral position to a first selected position to render operable only the driving means coupled to one of said pair of propelling wheels and means operable when and for as long as said control means is shifted from its neutral position to a second selected position to render operable only the driving means coupled to the other of said pair of propelling wheels whereby the heading of said tracing unit on said chart will be changed as the particular propelling wheel then being driven pivots about the other then stationary propelling wheel, means coupling said simulated compass to said tracing unit for changing the heading of said compass in accordance with changes in heading of said tracing unit for indicating to the student a simulated heading of said trainer, means for transmitting to the student signals simulating radio signals broadcast to an aeroplane in actual flight, said signals being transmitted in accordance with the observed heading and position of said tracing unit on said chart, and means for varying the intensity of such signals.

4. In a trainer device for teaching a student in flying radio beam patterns the combination comprising a partition member disposed between the student and an observer, control means operable by the student, a simulated compass, said compass comprising a pair of co-axially mounted compass cards, the indicia on one card being 180° out of phase with the indicia on the other card, said compass cards being mounted adjacent an apertured portion of said partition member, one card being visible through said aperture to the student and the other visible to the observer, a chart visible to the observer, said chart being rendered invisible to the student by said partition member and said chart including a layout of a radio beam pattern thereon, a tracing unit, said tracing unit having chart marking means, propelling wheels and driving means coupled to said wheels to propel said tracing unit on said chart at an assumed forward speed of said trainer, means operable when said control means is in a neutral position to effect straight line propulsion of said tracing unit on said chart, means operable when and for as long as said control means is shifted from its neutral position to a first selected position for continuously changing the heading of said tracing unit in one direction of rotation, means operable when and for as long as said control means is shifted from its neutral position to a second selected position for continuously changing the heading of said tracing unit in the other direction of rotation, means coupling said compass cards to said tracing unit for changing the heading of said compass cards in accordance with changes in heading of said tracing unit for indicating to the student a simulated heading of said trainer, means operable by the observer for transmitting to the student signals simulating radio signals broadcast to an aeroplane in actual flight, said signals being transmitted in accordance with the observed heading and position of said chart marking means on said chart, and means operable by the observer for varying the intensity of such signals.

5. The combination of claim 4, wherein said compass cards are mechanically coupled by pulley and rope mechanism to said tracing unit to follow changes in heading of the tracing unit on the chart, said pulley and rope mechanism being carried by a pair of articulated arms, one of said arms being pivotally connected to said tracing unit and the other of said arms being pivotally supported on said partition member.

6. A tracing unit adapted to be moved over a chart for use as part of a trainer device for teaching a student in flying radio beams, said tracing unit including a pair of axially aligned wheels for propelling the tracing unit, chart marking means, and driving means for said wheels, said driving means being operable at the will of the student for driving said wheels either one at a time or together to cause said marking means to trace over said chart a course simulated by the student.

7. A tracing unit adapted to be moved over a chart for use as part of a trainer device for teaching a student in flying radio beams, said tracing unit including a pair of axially aligned wheels for propelling the tracing unit, chart marking means disposed between said wheels, and separate motors for driving each of said wheels, said motors being selectively operable at the will of the student for driving the wheels either one at a time or together to cause said marking means to trace over said chart a course simulated by the student.

ARTHUR H. DELAREUELLE.
HARRY PRICE.